Patented Aug. 20, 1935

2,012,094

UNITED STATES PATENT OFFICE 2,012,094

BLACK DYEING SULPHUR DYESTUFFS AND PROCESS OF MAKING SAME

Hermann Bots and Ernst Dür, Basel, Switzerland, assignors to Society of Chemical Industry in Basle, Basel, Switzerland No Drawing. Application February 9, 1934, Serial No. 710,570. In Switzerland February 25, 1933

6 Claims. (Cl. 260—19)

It is known that the leuco-indophenol which is formed by reduction of the condensation product from nitrosophenol and carbazole can be converted into dyestuffs containing sulphur by treatment with agents yielding sulphur, different dyestuffs being obtained according to the conditions of the sulphurization. If the sulphurization is carried out under mild conditions, for example, by boiling the leuco-indophenol in a reflux apparatus with an aqueous sodium polysulphide solution, there are formed sulphur dyestuffs. By carrying out the sulphurization under more energetic conditions, the formation of the sulphur dyestuff is repressed, and a vat dyestuff is almost exclusively obtained as a final product. Such processes leading to vat dyestuffs are the processes of Patents 956,348, 1,565,736, 1,695,756, and 1,759,261.

It is further known that the diarylamines of the general formula

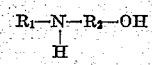

wherein $R_1$ represents a naphthalene nucleus and $R_2$ a benzene nucleus, and wherein further the OH-group stands in para-position to the NH-group, can be converted into sulphurized dyestuffs by treatment with an agent yielding sulphur. Hitherto this treatment has consisted either in melting the diarylamine with sulphur or in heating the diarylamine in an aqueous medum with sodium sulphide or sodium polysulphide. The products obtained dye vegetable fibers brown to blue-black, violet-black and black shades which, indeed, have a remarkable fastness to chlorine but are always weak and unsightly.

According to the present invention dyestuffs which are valuable, more particularly on account of their depth of dyeing and fastness to chlorine are produced by sulphurizing the above characterized diarylamines under such conditions of sulphurization which convert the leuco-indophenol from the indophenol obtained from carbazole and nitrosophenol into a vat-dyestuff. The new products which have the character of sulphur dyestuffs and not of vat dyestuffs, form black powders which are insoluble in water and alcohol and dissolve in sulphuric acid to pure blue solutions. With sodium sulphide and alkalies they yield leuco compounds of pure yellow color which are distinguished by their great affinity for the vegetable fiber. Thus the black dyeings produced with their aid are distinguished by their surprising coloring power, i. e. their strength, and further by their good fastness properties to chlorine, washing and light.

As examples of what is meant by sulphurizing under conditions by which the leuco-carbazole-indophenol is converted into vat dyestuffs there may be named: the treatment with a polysulphide as free from water as possible in presence of an organic solvent, such as alcohol, pyridine, amyl alcohol, cyclohexanol or the like; or treatment by the baking processes, such latter processes are described in the patents cited in the second paragraph of this specification, particularly valuable results being obtained with the diarylamines of the general formula

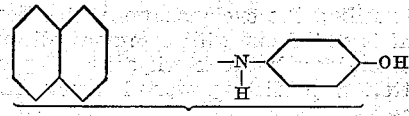

wherein the

group is linked to the naphthalene nucleus at the 1- or at the 2-position. The dyestuffs thus obtained may be converted into the finished oxidized dyestuffs by a suitable oxidation, for instance by blowing air through the alkaline solution of their leuco-compounds, or by action of the air on the separated dyestuffs, or by any other method.

The following examples illustrate the invention without, however, limiting its scope; the temperatures, concentrations and proportions of sulphurizing agents may be varied within certain limits; also the process can be applied to parent materials other than those prescribed in the examples, for instance to 4-hydroxydiphenylamine or to diarylamines in which both the aryl nuclei belong to the benzene series. The process may also be applied to diarylamines, in which one of the aryl nuclei belongs to a different series, for instance to the anthracene, carbazole or naphthocarbazole series or to the acridine series. The parts are by weight:—

Example 1

Into 30 parts of fused crystallized sodium sulphide 12 parts of sulphur are introduced and the mixture is heated until the sulphur is dissolved. It is then evaporated at about 140° C. This concentrated solution is introduced into 100 parts of alcohol and there are added 9 parts of 1-(4'-hydroxy)-phenylaminonaphthalene of the formula

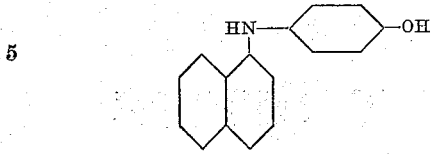

and the whole is boiled for 48 hours in a reflux apparatus. The alcohol is then distilled and water is added to take its place. From the aqueous solution thus obtained the dyestuff is salted out with common salt or ammonium chloride. When dry it is a blue-black powder which dyes cotton in a sodium sulphide bath violet-black shades. The dyeings are fast to chlorine.

By substituting 2-(4'-hydroxy)-phenylaminonaphthalene for the 1-(4'-hydroxy)-phenylaminonaphthalene in this example there is produced a somewhat more violettish-black dyestuff.

Example 2

A concentrated polysulphide solution is made by dissolving 7 parts of sulphur in 15 parts of crystallized sodium sulphide and evaporating the solution at 140° C. This solution added to 50 parts of cyclohexanol and 3 parts of sulphur and 8 parts of 2-(4'-hydroxy)-phenylaminonaphthalene of the formula

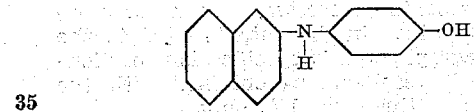

are added. The whole is now boiled for 4 hours. After expelling the cyclohexanol with steam the dyestuff is salted out with common salt, ammonium chloride or hydrochloric acid. It produces on cotton a reddish, powerful black fast to chlorine.

2-(4'-hydroxy)-phenylamino-1,6-dibromonaphthalene when sulphurized in the manner described in this example yields a red-violet black dyestuff and 2-(4'-hydroxy-2,5-dichloro)-phenylaminoanphthalene yields a blue-black dyestuff when similarly sulphurized. Like results are produced if pyridine or amylalcohol is substituted for the cyclohexanol.

Example 3

15 parts of crystallized sodium sulphide, 10 parts of water, 18 parts of sulphur, 10 parts of 2-(4'-hydroxy)-phenylaminonaphthalene and 4 parts of benzidine are intimately mixed and the mixture is dried in a vacuum. It is then baked at 190–200° C. until no more sulphuretted hydrogen is evolved. The mass is then treated with hot sodium sulphide solution and filtered, the dyestuff being precipitated from the filtrate in the usual manner. It produces on cotton a greenish-black fast to chlorine.

When 3 parts of carbanilide are substituted for the benzidine in this examaple the product is a reddish black dyestuff.

Example 4

Cotton is dyed in the manner usual for sulphurized dyestuffs with 5 to 6 per cent. of the product of the foregoing Example 1, 25 per cent. of sodium sulphide, 5 grams of calcined sodium carbonate per liter of vat-liquor and 25 grams of calcined sodium sulphate per liter of vat liquor, the ratio of cotton to liquor being 1:20. The dyestuff is first boiled with the sodium sulphide solution 10 times diluted as well as with the sodium carbonate solution 10 times diluted until it is dissolved. The dyestuff is then added to the vat-liquor, heated to 60° C., the goods are entered and heating is carried nearly to the boiling point. Thereupon Glauber's salt is added and the dyeing continued for 1 hour. The yarn is now wrung out and exposed to the air for oxidation. Thorough rinsing and drying conclude the process.

What we claim is:—

1. Process for the manufacture of black-dyeing sulphur dyestuffs which are distinguished by their great coloring power, consisting in sulphurizing the diarylamines of the general formula

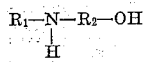

wherein $R_1$ represents an aromatic radical of the naphthalene series and $R_2$ an aromatic radical of the benzene series, wherein further the OH-group stands in 4-position to the NH-group, with polysulphides in the presence of cyclohexanol.

2. Process for the manufacture of black-dyeing sulphur dyestuffs which are distinguished by their great coloring power, consisting in sulphurizing the diarylamines of the general formula

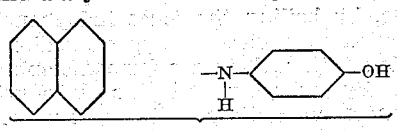

wherein the

group is linked to the naphthalene nucleus at the 1- or at the 2-position, with polysulphides in the presence of cyclohexanol.

3. Process for the manufacture of a black-dyeing sulphur dyestuff which is distinguished by its great coloring power, consisting in sulphurizing the diarylamine of the formula

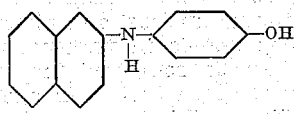

with polysulphides in the presence of cyclohexanol.

4. The black sulphur dyestuffs characterized by their great coloring power, forming black powders which are insoluble in water and in alcohol, and dissolve in sulphuric acid to pure blue solutions and in dilute sodium sulphide solution to pure yellow solutions, and dyeing cotton in the manner customary for sulphur dyestuffs deep black shades at a ratio of dyestuff to material of 5 to 6:100, which products are obtained by sulphurizing the diarylamines of the general formula

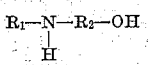

wherein $R_1$ represents an aromatic radical of the naphthalene series and $R_2$ an aromatic radical of the benzene series, wherein further the OH-group stands in 4-position to the NH-group.

5. The black sulphur dyestuffs characterized by their great coloring power, forming black powders which are insoluble in water and in alcohol, and dissolve in sulphuric acid to pure blue solutions and in dilute sodium sulphide solution to pure yellow solutions, and dyeing cotton in the manner customary for sulphur dyestuffs deep black shades at a ratio of dyestuff to material of 5 to 6:100, which products are obtained by sulphurizing the diarylamines of the general formula

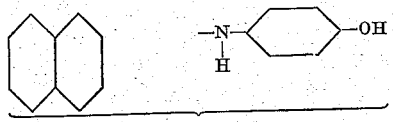

wherein the

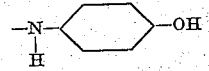

group is linked to the naphthalene nucleus at the 1- or at the 2-position.

6. The black sulphur dyestuff characterized by its great coloring power, forming a black powder which is insoluble in water and in alcohol, and dissolves in sulphuric acid to a pure blue solution and in dilute sodium sulphide solution to a pure yellow solution, and dyeing cotton in the manner customary for sulphur dyestuffs deep black shades at a ratio of dyestuff to material of 5 to 6:100, which product is obtained by sulphurizing the diarylamine of the formula

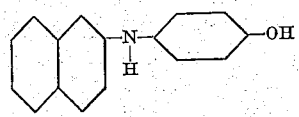

HERMANN BOTS.
ERNST DÜR.